United States Patent [19]
Hampton et al.

[11] 3,924,115

[45] Dec. 2, 1975

[54] ELECTROMAGNETIC PICK UP TOOL WITH BUILT-IN LIGHT

[75] Inventors: Harold E. Hampton; Leonard D. Ellard, both of Ogallala, Nebr.

[73] Assignee: 3 B & D Products, Incorporated, Ogallala, Nebr.

[22] Filed: June 14, 1974

[21] Appl. No.: 479,576

[52] U.S. Cl............ 240/6.4 R; 240/2.18; 240/6.46; 240/10.6 R; 240/10.66; 335/293
[51] Int. Cl.² ............................................. F21L 7/00
[58] Field of Search....... 240/2.18, 2 E, 10.6, 10.66, 240/6.46, 6.4 R; 335/293

[56] References Cited
UNITED STATES PATENTS

| 1,535,618 | 4/1925 | Mayer | 335/293 |
|---|---|---|---|
| 1,772,126 | 8/1930 | Barry | 335/293 |
| 3,582,638 | 6/1971 | Peters | 240/2.18 X |
| 3,798,440 | 3/1974 | Brindley | 240/10.66 |

FOREIGN PATENTS OR APPLICATIONS

| 692,689 | 8/1930 | France | 335/293 |
| 606,485 | 3/1926 | France | 335/293 |
| 742,837 | 12/1943 | Germany | 335/293 |

*Primary Examiner*—Joseph F. Peters, Jr.
*Attorney, Agent, or Firm*—Burns, Doane, Swecker & Mathis

[57] ABSTRACT

A portable, hand-held device suitable for locating objects and retrieving magnetically attractable objects from otherwise inaccessible areas, which includes a suitable source of electrical current and suitable switches to selectively control the energization of a light source and an electromagnet. The electromagnet is disposed at one end of a flexible member, or "goose-neck", which is connected at a second end to the hand-held device adjacent the light source. Optical fibers within the flexible member transmit light from the light source to the end of the flexible member whereby an inaccessible area can be illuminated to locate an object therein. A magnetically attractable object may be retrieved by energizing the electromagnet disposed at the end of the flexible member.

15 Claims, 5 Drawing Figures

ELECTROMAGNETIC PICK UP TOOL WITH BUILT-IN LIGHT

BACKGROUND OF THE INVENTION

1. Field of the Invention

The invention relates to the location and retrieval of magnetically attractable objects using electromagnetic means disposed at an end of a flexible member.

2. Description of the Prior Art

Electromagnetic pick-up devices suitable for retrieving magnetically attractable objects from otherwise inaccessible locations have been known for some time, and U.S. Pat. No. 1,772,126, issued to Ernest M. Barry, on Aug. 5, 1930, is illustrative of one such device. Such known devices, however, do not provide any means to locate the objects which are being retrieved. In addition, such devices often require long cords which must be connected either to a storage battery or to a conventional source of alternating current to provide electrical current necessary for operation of the electromagnet. Moreover, the electromagnetic portion of such devices is often of a size and shape substantially larger than that of the flexible member supporting it and thus is easily snagged within the inaccessible area.

Portable illumination devices are also known in which a bundle of optical fibers illuminated at one end by the bulb of a pen light, have been utilized to illuminate inaccessible areas. The U.S. Pat. No. 3,582,638, issued on June 1, 1971 to Maurice E. Peters is illustrative of such known illumination devices which do not provide means of retrieving an object once the object has been located.

Accordingly, it is an object of this invention to obviate these and other deficiencies of the known illumination and retrieval devices and to provide a novel single, portable, hand-held unit which includes means for both locating and subsequently retrieving magnetically attractable objects from inaccessible areas.

It is another object of this invention to provide a novel hand-held electromagnetic pick-up device in which magnetic field strength of the electromagnet is concentrated at the remote pick-up end thereof rather than having an electromagnet exhibiting substantial field strength at the sides and near end in addition to the remote end thereof.

A further object of this invention is to provide a novel hand-held electromagnetic pick-up device having a flexible shaft which tends to retain the configuration into which it is shaped.

These and many other objects will appear from the drawings, claims and from the description of a preferred embodiment of the invention when read in conjunction with the appended drawing.

BRIEF DESCRIPTION OF THE DRAWINGS

One preferred embodiment of the invention is illustrated in the drawings wherein:

FIG. 3 is an elevation in longitudinal section taken along line 3—3 of FIG. 1;

DESCRIPTION OF THE PREFERRED EMBODIMENT

Figure 1:
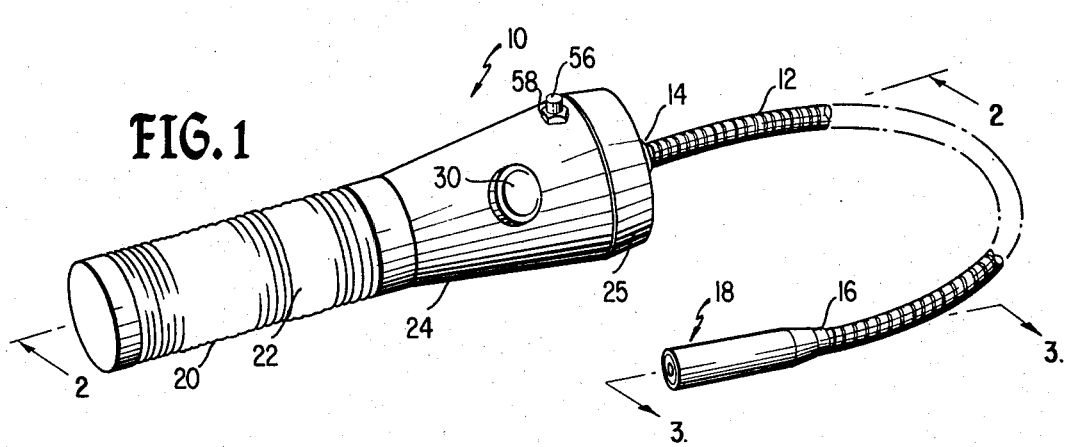
FIG. 1 is a pictorial view of the novel device of the instant invention.

The following description of a preferred embodiment of the invention may be best understood by reference to FIG. 1 wherein the hand-held unit 10 as illustrated as being provided with a hollow, slender, metallic flexible member 12 projecting from one end thereof. The flexible member 12 is connected to the hand-held unit 10 at a first, or near, end 14 and is provided with an electromagnet 18 that is connected to the second, or remote, end 16 thereof. The hand-held unit 10 with the attached flexible member 12 and electromagnet 18 comprises a portable device which may be used for retrieving magnetically attractable objects from otherwise inaccessible locations as will be described more fully hereinafter.

It will be noted from FIG. 1 that the flexible member 12 comprises a generally slender member in that the length thereof is substantial relative to the cross-sectional dimension thereof. Although the flexible member 12 illustrated in the drawings includes a generally circular cross-sectional configuration, it will be apparent to those skilled in the art that cross-sectional configurations other than circular may be advantageously used. For example, in an application where it is desired to have a member which flexes only in one plane, a rectangular cross-sectional configuration might be used.

The electromagnet 18 provided at the second end 16 of the flexible member 12 is illustrated as having a diameter substantially the same as the diameter of the flexible member 12. Substantially similar dimensions of the electromagnet 18 and the flexible member 12 substantially diminish the possibility of the electromagnet 18 being stuck in an inaccessible location. Moreover, since the slightly larger diameter electromagnet 18 penetrates the inaccessible area before the slightly smaller diameter flexible member 12, sufficient clearance for the member 12 may be assured. To further diminish the possibility of sticking during extraction from an inaccessible area, a gradual transition may be provided between the diameter of electromagnet 18 and the second end 16 of the flexible member 12.

With continued reference to FIG. 1, the hand-held unit 10 comprises a generally cylindrical metallic section 20 threadedly connected to a plastic section 24 which threadedly carries a cap member 25. The metallic section 20 may be provided with a plurality of circumferential grooves 22 which facilitate gripping of the hand-held unit 10 by the hand of an operator. The plastic section 25 may be generally frustoconical and may be longitudinally divided into two portions 24a, 24b (see FIG. 4) to facilitate the assembly of various components to be described more fully hereinafter.

Figure 2:
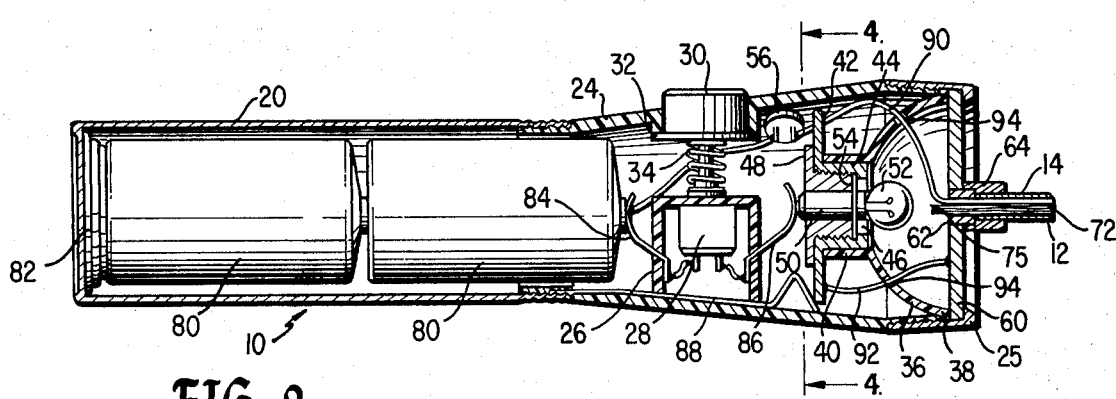
FIG. 2 is an elevation in partial section taken along line 2—2 of FIG. 1.

One portion of the plastic section 24 may be provided internally with a generally U-shaped bracket 26 on which a first switch 28 may be mounted as depicted in FIG. 2. The first switch 28 may be a conventional push button switch and may be actuated by a button 30 which protrudes through the plastic section 24 diametrically opposite the bracket 28. The button 30 may be provided with a flange 32 to prevent the button 30 from being pushed completely through the housing by a biasing spring 34.

With continued reference to FIG. 2, the end of the plastic section 24 may be provided with a reflector 36 which may be fabricated from plastic and which may include a conventional highly reflective surface. The reflector 36 may be provided with a radially outwardly extending flange 38 to engage the end of plastic section 24 and thereby position the reflector 36 within the hand-held unit 10.

The reflector 36 may also be provided with a cylindrical portion 40 coaxially disposed in relation to the plastic section 24 for internally receiving a cylindrical portion 44 of a generally radial metallic conducting flange 42. The metallic conducting flange 42 may be provided with a partially threaded cylindrical hole 46 having a diameter sized to permit an incandescent light bulb 52, or other suitable light source, to pass therethrough.

The hole 46 receives a threaded portion of a plastic member 48 which may include a coaxial bore 50 to receive the base of bulb 52. The bulb 52 may include a radially outwardly extending flange 54 for positioning the bulb 52 in relation to the plastic member 48 and the cylindrical portion 44 of conducting flange 42. The flange 54 of bulb 52 also functions as an electrical contact with conducting flange 42. Threaded engagement between the plastic member 48 and hole 46 of the metallic conducting flange 42 also positions bulb 52 such that light emanating therefrom is reflected by reflector 36.

The plastic section 24 also carries a second switch 56 on the frustroconical surface thereof (FIG. 1). The switch 56 may comprise a conventional push button contact switch biased toward a current interrupting position to interrupt electrical contact between switch contacts and may be secured to the plastic section by nut 58.

As shown in FIG. 2 in abutment with the radial flange 38 of the reflector 36, a generally circular metallic plate 60 and the reflector 36 may be positioned with respect to the plastic section 24 by the cap member 25 which is threadably secured thereto. The circular plate 60 may be provided with a threaded hole 62 generally at the center thereof and adjacent to bulb 52.

The first end 14 of flexible member 12 may be provided with a connector 64 that is received by the threaded hole 62 to connect the first end 14 of flexible conduit 12 to the hand-held unit 10. The second end 16 of the flexible member 12 is also provided with a connector 66 for connection with a cylindrical housing 68 of the electromagnet 18 (see FIG. 3).

The hollow flexible member 12 may have a plurality of optical fibers 72 disposed therein for conveying light from the bulb 52 of the hand-held unit 10 to exit the second end 16 of the member 12. The flexible member 12 may be used effectively to protect the optical fibers 72 from accidental scratching while providing sufficiently rigid support for electromagnet 18.

One end 75 of each fiber 72 is illustrated in FIG. 2 as being disposed in proximity to bulb 52 for receiving light therefrom and for receiving light reflected from the reflector 36. In addition, the second end 74 of each fiber 72, as illustrated in FIG. 3, is coaxially carried by electromagnet 18 such that light may emanate therefrom to aid the location of an object.

With continued reference to FIG. 3, the cylindrical housing 68 of electromagnet 18 may be preferably fabricated from a ferrous material. Coaxially disposed within housing 68, an electromagnet coil 70 may be disposed which comprises a coil of wire wrapped on a non-ferrous spool or pole piece 71. The spool 71 may be provided with a coaxial longitudinal opening 76 therethrough for receiving the second ends 74 of the optical fibers 72. The spool 71 carrying electromagnet 70 may be secured within the housing 68 in any conventional manner. The described construction of electromagnet 18 effectively concentrates the greatest amount of magnetic pick-up strength at an end 73 of the housing 68 since the combination of the ferrous housing 68 with electromagnetic coil 70 having a non-ferrous spool 71 defines an optimum magnetic flux path and virtually eliminates any magnetic field strength at the sides or back end of the housing 68.

Figures 4, 5:
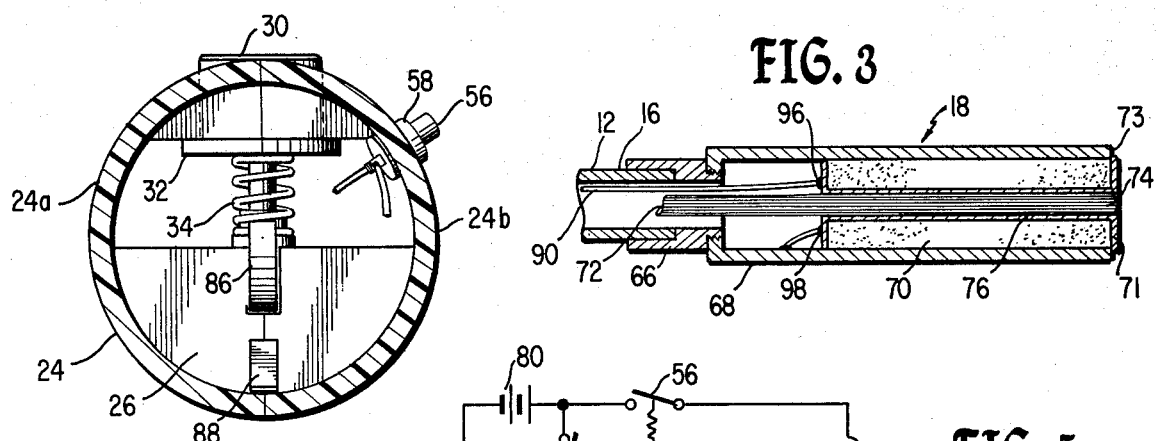
FIG. 4 is an elevation in transverse section taken along line 4—4 of FIG. 2.
FIG. 5 is a schematic wiring diagram of the electrical circuit of the device of FIG. 1.

Apparatus for the necessary electrical circuitry schematically illustrated in FIG. 5 will now be described by reference to FIG. 2 wherein the metallic section 20 of the hand-held unit 10 is illustrated as containing a pair of batteries 80 to provide a source of electrical current consistent with the portable nature of the apparatus. The closed end of metallic section 20 also contains a spring 82 which creates a longitudinal force on the batteries 80 to ensure electrical contact between batteries 80 and a battery contact member 84 while simultaneously providing electrical contact between metallic section 20 and one end of the batteries 80.

The battery contact member 84 may be carried by the U-shaped bracket 26 within the plastic section 24 and may be provided with electrical connections to both the first switch 28 and the second switch 56. These electrical contacts may comprise conventional wires or any other suitable electrical conducting means. Disposed between the U-shaped bracket 26 and the base of bulb 52 may be a bulb-base contact member 86 one end of which electrically contacts the base of bulb 52 and the second end of which is carried by bracket 26 and may be electrically connected with switch 28. The plastic section 24 internally carries a grounding contact member 88 one end of which electrically contacts the metallic section 20 and the second end of which electrically contacts the metallic conducting flange 42 described above.

To conduct electricity from the switch 56 to the electromagnetic coil 70, a wire 90 may be provided. The wire 90 may pass through a hole 94 provided therefore in reflector 36 and may be disposed within the hollow interior of flexible member 12.

To conductively interconnect the metallic conducting flange 42 and the circular metallic member 60, a connector wire 92 may be provided which passes through a hole 94 provided in reflector 36. In FIG. 3 the cylindrical housing 68 is internally provided with a conventional conductor to connect a second contact 98 of electromagnetic coil 70 therewith.

In operation, when it is desired to locate and to retrieve a magnetically attractable object from a location wherein it would otherwise be inaccessible, the remote end 16 of the flexible member 12 is directed towards the inaccessible object. To facilitate the positioning of the remote end 16 of the flexible conduit in proximity to the inaccessible metal object, the first switch 28 may be closed to illuminate bulb 52 provided within the hand-held unit 10 whereupon electrical current passes from the batteries 80 through the battery contact member 84, the switch 28, and the bulb base contact member 86 to the base of the bulb 52. Electrical current returns from the bulb 52 through the bulb flange 54, the metallic conducting flange 42, the grounding contact member 88, the metallic housing portion 20, and the spring 82 to the batteries 80.

Light emanating from the bulb 52 may be reflected, intensified or concentrated by the reflector 36 adjacent the ends 75 of the optical fibers 72 which may be disposed in proximity to bulb 52. The optical fibers 72 transmit light from the bulb 52 to the second ends 74 of the optical fibers 72 whereupon the light exits to illuminate an area near the second end 16 of flexible member 12. The light facilitates maneuvering of the flexible member 12 and electromagnet 18 to position near a magnetically attractable object to be retrieved.

When the second end 16 of flexible member 12 and the electromagnet 18 attached thereto have been positioned, the switch 56 may be closed whereup electromagnetic coil 70 is energized by electrical current which flows from the batteries 80 through the switch 56, and the wire 90 to the first contact 96 of the electromagnetic coil 70. Electrical current is conducted from the coil 70 through the second contact 98 thereof, the cylindrical housing member 68, the connector 66, the flexible member 12, the connector 64, the circular member 60, the wire 92, and the metallic conducting flange 42. With electrical current flowing through electromagnetic coil 70, an electromagnetic field is established which attracts the magnetically attractable object to the electromagnet 18. While maintaining this flow of electrical current by holding switch 56 closed, the magnetically attractable object which was located and subsequently attracted to the electromagnet 18 may be retrieved by withdrawing the flexible member 12 and the electromagnet from the inaccessible location.

At this point it should be apparent that the invention herein described provides an efficient and useful apparatus for both locating and retrieving magnetically attractable objects from inaccessible locations which is quite efficient in operation.

Moreover, the hand-held unit is portable and may be carried to any location for use there. The switches controlling the operation of the light source and the electromagnet are mounted on the hand-held unit such that both switches may be readily operated by one hand of an operator thereby freeing the operator's other hand to maneuver the flexible member in the inaccessible location to find and retrieve the object sought.

Although the present invention has been described in conjunction with a specific embodiment thereof, many alternatives, modifications, variations and equivalents will be apparent to those skilled in the art. Accordingly, it is expressly intended that all such alternatives, modifications, variations and equivalents which fall within the spirit and scope of the invention as defined in the appended claims be embraced thereby.

What is claimed is:

1. Portable apparatus for locating and retrieving magnetically attractable objects from otherwise inaccessible locations comprising:
    a hand-held unit;
    at least one battery internally carried by said unit to provide a source of electrical current;
    an incandescent light bulb carried internally by said unit;
    a first switch means carried by said unit for selectively applying electrical current from said at least one battery to said light bulb;
    a flexible member having two ends, one end being connected to said unit adjacent said light bulb;
    a flexible light conduit carried internally of said flexible member for conveying light from said light bulb through the length of said flexible member to exit the second end of said flexible member;
    an electromagnet carried by the second end of said flexible member radially outward of said conduit, said electromagnet having a cross-sectional configuration which approximates the cross-sectional configuration of said flexible member and a sharply curtailed lateral magnetic flux field whereby the electromagnet is not attracted laterally to magnetically attractable objects; and
    a second switch means carried by said unit for selectively applying electrical current from said at least one battery to said electromagnet.

2. The portable apparatus of claim 1:
    wherein said light conduit comprises a plurality of optical fibers disposed centrally of said flexible member; and
    wherein said electromagnet comprises a generally cylindrical electromagnet having axial polarization in response to the application of electrical current from said at least one battery.

3. The portable apparatus of claim 2 wherein:
    said second switch means includes a contact type switch spring biased toward a current interrupting position.

4. Portable apparatus for locating and retrieving magnetically attractable objects from otherwise inaccessible locations comprising:
    a hand-held unit;
    a pair of batteries internally carried by said unit to provide a source of electrical current;
    a light bulb internally carried by said unit;
    switch means carried by said unit for selectively connecting electrical current from said batteries to said light bulb;
    a reflector carried internally by said unit and disposed adjacent said light bulb to reflect light from said light bulb;
    a slender hollow flexible member having two ends, one end being attached to said unit adjacent said light bulb;
    a plurality of optical fibers carried within said flexible member for conveying light from said light bulb and reflected light from said reflector through said flexible member to the second end thereof;
    a cylindrical, axially polarizable electromagnet having a generally cylindrical housing of ferrous metal surrounding a coil of wire, being carried by the second end of said flexible member and having a cross-sectional configuration approximating the cross-sectional configuration of said flexible member; and
    a spring-biased contact switch carried by said unit for selectively energizing said cylindrical electromagnet by selectively supplying electrical current from said batteries to said cylindrical electromagnet, said spring-biased switch being spring biased toward an electrical current interrupting position.

5. Portable apparatus for locating and retrieving magnetically attractable objects from otherwise inaccessible locations comprising:
    a hand-held unit;

a source of electrical current internally carried by said unit;

a light source internally carried by said unit;

a slender flexible member having two ends, one end connected to said unit adjacent said light source;

a flexible light conduit carried by said flexible member for conveying light from said light source to the second end of said flexible member;

axially polarizable electromagnetic means for concentrating a magnetic flux field at an end of the electromagnetic means while substantially eliminating a magnetic flux field radially thereof, said electromagnetic means being carried by the second end of said flexible member and having a cross-sectional configuration substantially similar to the cross-sectional configuration of said flexible member; and switch means for selectively connecting electrical current from said current source to said light source and to said electromagnetic means, said switch means carried by said unit.

6. The apparatus of claim 5:

wherein said electromagnetic means comprises a generally cylindrical electromagnet.

7. The portable apparatus of claim 6 wherein said electromagnetic means comprises:

a non-ferrous pole piece;

a coil of wire carried radially outwardly by said pole piece; and a generally cylindrical housing of ferrous metal which carries said coil and said pole piece internally thereof, said housing being connected to the second end of said flexible member.

8. The portable apparatus of claim 7:

wherein said pole piece includes a coaxial opening longitudinally therethrough which supportingly receives an end of said flexible light conduit.

9. The apparatus of claim 5:

wherein said switch means includes a first switch for connecting electrical current from said current source to said light source and a second switch for connecting electrical current from said current source to said electromagnetic means; and wherein said first and second switches are mounted on said unit to be operable by one hand of an operator.

10. Portable apparatus for locating and retrieving magnetically attractable objects from otherwise inaccessible locations comprising:

a hand-held unit;

a source of electrical current carried within said unit;

a light source carried within said unit;

a shielded flexible light conduit attached at one end to said unit adjacent said light source and having a second end remote from said unit whereby light is transmitted through said conduit from said light source to said remote end;

electromagnetic means for generating an axial magnetic flux field while sharply restricting the associated radial flux field whereby radial attraction of the electromagnetic means is curtailed, said electromagnetic means being disposed radially outwardly of said remote end of said flexible member, and having a slender configuration; and switch means for selectively connecting electrical current from said current source to said light source and to said electromagnetic means, said switch means being operable from said unit and carried thereby.

11. The apparatus of claim 10 wherein said electromagnetic means comprises:

a non-ferrous pole piece disposed radially outwardly of said remote end of said light conduit;

a coil of wire carried radially outwardly by said pole piece; and a generally cylindrical housing of ferrous metal disposed radially outwardly of said coil.

12. The apparatus of claim 11:

wherein said switch means includes a first switch for connecting electrical current from said current source to said light source and a second switch for connecting electrical current from said current source to said electromagnetic means; and wherein said first and second switches are mounted on said unit to be operable by one hand of an operator.

13. The apparatus of claim 10:

wherein flexible means for retention of a desired configuration shields the flexible light conduit, said flexible means extending from said hand-held unit to said electromagnetic means.

14. The apparatus of claim 10:

wherein an electrically conductive flexible conduit means for providing one electrical connection between the hand-held unit and the electromagnetic means shields the flexible light conduit so that only a single wire extends therebetween to effect energization of the electromagnetic means.

15. Portable apparatus for locating and retrieving magnetically attractable objects from otherwise inaccessible locations comprising:

a hand-held unit;

source means for providing a source of electrical current, being carried internally by the hand-held unit;

a light source carried internally of the hand-held unit and selectively connectable with the source means;

a hollow electrically conductive flexible member tending to retain a manipulated configuration and having two ends, one end being connected to the hand-held unit adjacent the light source;

a flexible light conduit positioned within the flexible member and extending between the two ends thereof for conveying light from the light source to the other end of the flexible member;

a non-ferrous pole piece surrounding the flexible light conduit at the second end of the flexible member;

a coil of wire carried radially outwardly by the pole piece, the coil of wire being selectively connectable with the current source; and a ferrous housing surrounding the coil of wire and carried by the other end of the flexible member whereby the flexible member may be manipulated to a desired configuration to reach a magnetically attractable object that is illuminated by light emanating from the light conduit within the pole piece such that a magnetically attractable object may be attracted to the pole piece by selective energization of the coil while the ferrous housing confines a magnetic force field to the end of the pole piece thus substantially eliminating lateral attraction to other magnetically attractive objects.

* * * * *